United States Patent

Petersen et al.

Patent Number: 6,005,871
Date of Patent: Dec. 21, 1999

[54] MINICELL ALIGNMENT

[75] Inventors: Lars-Göran Petersen, Tumba; Lars Göran Wilhelm Eneroth, Tyresö, both of Sweden

[73] Assignee: Telefonaktiebolaget LM Ericsson, Stockholm, Sweden

[21] Appl. No.: 08/741,360

[22] Filed: Oct. 30, 1996

Related U.S. Application Data

[60] Provisional application No. 60/024,299, Aug. 22, 1996.

[51] Int. Cl.⁶ .................................................. H04L 12/56
[52] U.S. Cl. ............................................ 370/474; 370/395
[58] Field of Search ..................................... 370/474, 389, 370/395, 396, 465, 537, 538, 536, 542, 503, 392, 471, 472, 475, 476, 477

[56] References Cited

U.S. PATENT DOCUMENTS

| | | | |
|---|---|---|---|
| 4,679,189 | 7/1987 | Olson et al. | 370/396 |
| 4,947,388 | 8/1990 | Kuwahara et al. | 370/411 |
| 5,457,681 | 10/1995 | Gaddis et al. | 370/466 |
| 5,509,007 | 4/1996 | Takashima et al. | 370/391 |

FOREIGN PATENT DOCUMENTS

| | | |
|---|---|---|
| 0225714 | 6/1987 | European Pat. Off. . |
| 9517789 | 6/1995 | European Pat. Off. . |

OTHER PUBLICATIONS

G. Eneroth et al., "Minicell Protocol (AALm) for Low Bit Rate Applications" ATM–Forum 96/0166, Feb., 1996.
T. Ishihara, "Proposal of Short Cell Format for Low Bit Rate Voice", ATM–Forum/95–1478, Dec. 1995.
"AAL–CU–CIF Protection with or without Payload Protection", Swiss Telecom PTT, ITU–T Rapporteur's Meeting on AAL–CU, Stockholm, Jul. 1996.
H. Ohta et al., "A Technique to Detect and Compensate Consecutive Cell Loss in ATM Networks", vol. 2, Apr. 7, 1991, pp. 781–790.
W. Covington, Jr. et al., "Voice Transport on an ATM Broadband Network", vol. 3 of 3, Nov. 27, 1999, pp. 1921–1925 Standard Search Report, Apr. 18, 1997.

*Primary Examiner*—Dang Ton
*Attorney, Agent, or Firm*—Burns, Doane, Swecker & Mathis, L.L.P.

[57] ABSTRACT

In a telecommunication system that employs asynchronous transfer mode (ATM) and minicells to transport communication data, accurate minicell header information dramatically improves the ability to align the minicells at a receiving station. More accurate minicell header information can be achieved by deriving a single header integrity check code (e.g., a cyclic redundancy code) for each ATM cell based upon minicell headers that have been inserted into contiguous locations in the ATM cell. By inserting the headers in contiguous locations, the receiving station can extract each header without having to rely upon the length indicator codes in each header, which may contain one or more bit errors. This, in turn, allows the receiving station to recompute the header integrity check code with far fewer errors, thus substantially increasing the probability of detecting and correcting the aforementioned errors and, ultimately, the ability to align the minicells.

30 Claims, 5 Drawing Sheets

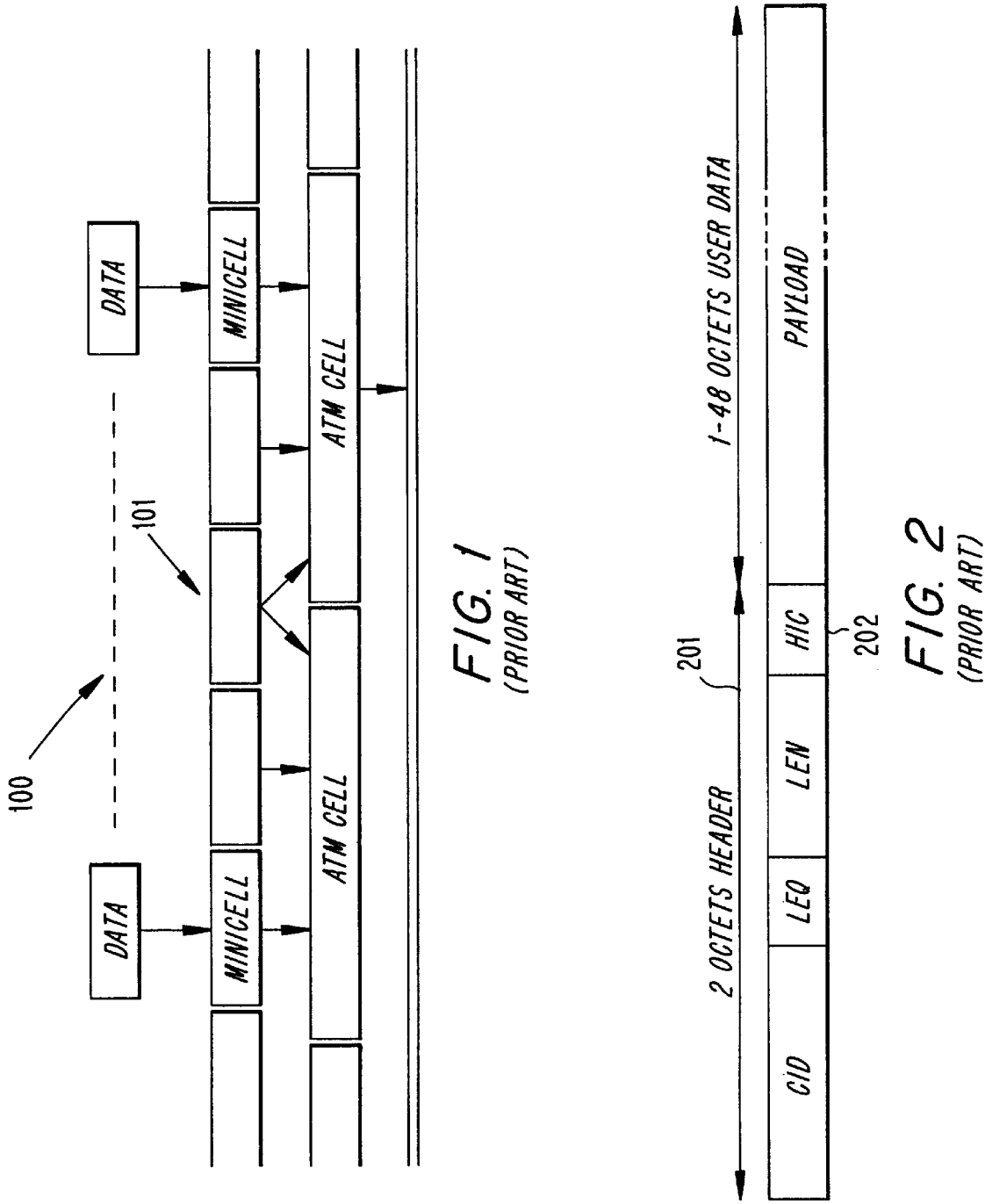

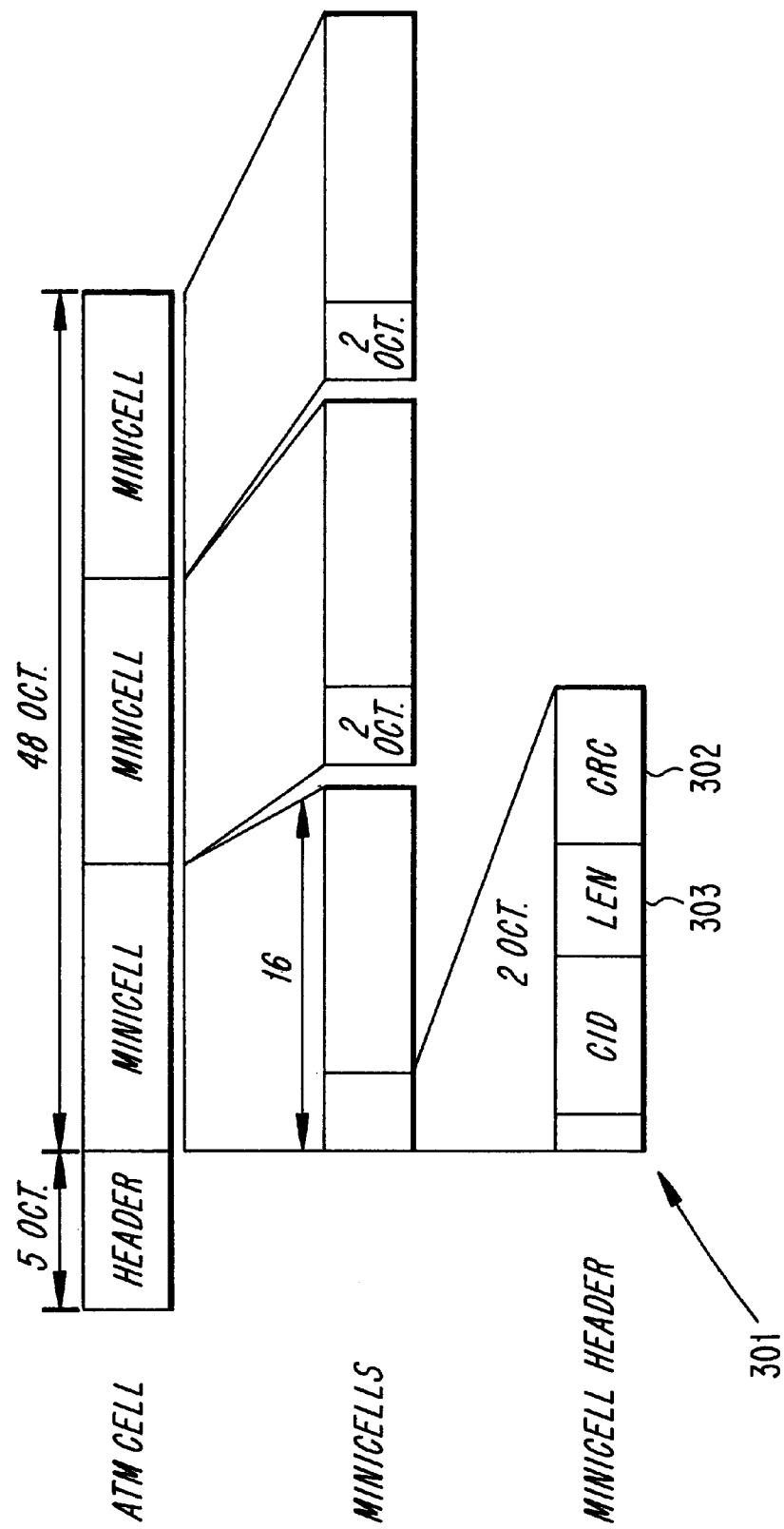

MINICELL ALIGNMENT

CROSS-REFERENCE TO RELATED APPLICATION

This Application claims the benefit of U.S. Provisional Application No. 60/024,299, filed Aug. 22, 1996.

BACKGROUND

The present invention relates to the transportation of telecommunication data from a sending station to a receiving station via small data packets referred to as minicells using the Asynchronous Transfer Mode (ATM) protocol. More specifically, the present invention relates to a method and apparatus for detecting and correcting bit errors that may occur in the header portion of each minicell during transmission and for maintaining the alignment of the minicells.

The Asynchronous Transfer Mode (ATM) is a standard protocol for transmitting telecommunication data within a telecommunication system (e.g., a cellular telephone system). Data is transmitted in fixed-size packets called ATM cells. Each ATM cell contains a 48 octet payload and a 5 octet header. ATM is well known in the art and is commonly used for high bit rate applications (e.g., multimedia communication); however, ATM can be used to significantly improve the efficiency of low bit rate applications as well.

When ATM is used for transporting low bit rate data, such as cellular voice data, it is generally advantageous to compress the low bit rate data into small data packets, which are multiplexed into the payload of ATM cells as illustrated by process 100 in FIG. 1. By multiplexing the data packets into the ATM stream, bandwidth utilization is dramatically improved. These small data packets are referred to hereinbelow as minicells.

Minicells are similar to ATM cells because they too contain a header portion, usually 2 octets in length, and a payload portion that can vary in length. Of course, to maximize bandwidth efficiency, it is necessary to pack as many minicells as possible into each ATM cell. Since the length of each minicell payload can vary, it is sometimes necessary to divide the minicell and insert a first part into the payload of one ATM cell and a second part into the payload of the next ATM cell.

A telecommunication system that transports communication data using minicells in the manner described above must address two basic concerns. First, the receiving station must be capable of maintaining minicell alignment. Minicell alignment refers to the process of determining where each minicell starts and ends within an ATM cell so that the receiving station can properly extract the data from each ATM cell. However, the ability to maintain proper minicell alignment is highly dependent upon the accuracy of the data contained in each minicell header. The ability to maintain proper minicell alignment is especially dependent upon the accuracy of the length indicator code (LIC) in each minicell header, where the LIC defines the number of octets that make up the corresponding minicell payload. The second concern, therefore, is to effectively detect and, whenever possible, correct bit errors that occur in the minicell headers, during the transmission of the data from the sending station to the receiving station, particularly those that occur in the LICs.

In the past, detecting and correcting errors in minicell headers was accomplished by employing a minicell header integrity check (HIC) code for each and every minicell header, as is well known in the art. For example, Göran Eneroth et al., "Minicell Protocol (AALm) for Low Bit Rate Applications," (February 1996), employs a two octet minicell header 201 in each and every minicell, as illustrated in FIG. 2. The minicell header 201 includes a two bit HIC code 202. The two bit HIC code maintains the integrity of the header information with a two bit interleaved parity check. In another example, illustrated in FIG. 3, Tomohiro Ishihara, "Proposal of Short Cell Format for Low Bit Rate Voice," (December 1995), employs a two octet minicell header 301 in each and every minicell, where each header includes an HIC error detection/error correction code 302. In this example, the HIC code is a five bit cyclic redundancy code (CRC) that is capable of three bit error correction and two bit error detection. Unfortunately, these techniques are not bandwidth efficient because each minicell header must dedicate several bits to perform the header integrity check. The inefficiency becomes more pronounced as the number of minicells per ATM cell increases and the size of the minicell payloads decreases.

Pending U.S. patent application Ser. No. 08/626,000, entitled "Combined Minicell Alignment and Header Protection" discloses a minicell header error detection and correction technique that overcomes the inefficient bandwidth utilization techniques described above. It accomplishes this by replacing the HIC codes in each minicell header with a single header integrity check code, (e.g., a cyclic redundancy code), located in the last octet of the corresponding ATM cell. At the receiving station, each minicell header is extracted and then used to recompute the CRC. In order to extract each minicell header, the receiving station must rely on the LICs in each minicell header, so that the receiving station can jump one minicell header location to the next, by counting the number of payload octets in between. The receiving station hardware will continue this process until all of the minicell headers in the ATM cell have been extracted. If, however, there is but one bit error in any of the LICs, the receiving station hardware will begin subsequently jumping to incorrect locations to find the minicell headers. This sequence of compound errors drastically reduces the probability of performing error detection and error correction since CRCs work much better when there are but a limited number of bit errors to detect and correct. As the number of bit errors increases, the probability of detecting and correcting those errors decreases significantly. Moreover, the ability to maintain minicell alignment is severely impaired since that process is, as previously stated, highly dependent upon accurate minicell header information, especially accurate minicell length information.

SUMMARY

The present invention is directed to an improved method and apparatus for insuring the accuracy of minicell header information. The present invention accomplishes this by providing a method and an apparatus that will permit the receiving station hardware to extract the minicell header information needed to recompute the CRC independent of the accuracy of the length indicator codes in each minicell header. As a result, the probability of error detection and error correction substantially increases as does the receiving stations ability to maintain minicell alignment.

It is an object of the present invention to provide a more effective method and apparatus for detecting and correcting bit errors in minicell headers that occur during the transmission of the data from a sending station to a receiving station.

It is another object of the present invention to provide an effective method and apparatus for detecting and correcting bit errors in minicell headers independent of the accuracy of the length indicator code data in each minicell header.

It is still another object of the present invention to provide an improved technique for maintaining minicell alignment by providing more accurate, error-free minicell header data.

In accordance with one aspect of the present invention, the foregoing and other objects are achieved by a method of maintaining data packet alignment, and an apparatus for implementing the method, comprising the steps of inserting communication data into a plurality of data packets, wherein each of the plurality of data packets comprises a payload portion and a header portion; multiplexing the payload portions into a corresponding plurality of contiguous locations in a data cell; multiplexing the header portions into a corresponding plurality of contiguous locations in the data cell; generating a header integrity check code as a function of the header portions; inserting the header integrity check code into the data cell; transmitting the data cell to a receiving station; detecting and correcting bit errors in the header portions, if any, using the header integrity check code; and aligning each payload portion in accordance with a corresponding one of the corrected header portions.

In accordance with another aspect of the present invention, the foregoing and other objects are achieved by a method of maintaining data packet alignment, and an apparatus for implementing the method, comprising the steps of: receiving a data cell which contains a plurality of contiguously located data packet payloads, a corresponding plurality of contiguously located data packet headers, and a trailer segment comprising a header integrity check code; regenerating a value for the header integrity check code as a function of the received data packet headers; detecting and correcting bit errors, if any, in the plurality of data packet headers as a function of the regenerated header integrity check code; and aligning the plurality of data packet payloads in accordance with the data packet headers as corrected.

BRIEF DESCRIPTION OF THE DRAWINGS

The objects and advantages of the invention will be understood by reading the following detailed description in conjunction with the drawings in which:

FIG. 1 is a diagram illustrating a process for multiplexing minicells into ATM cells;

FIG. 2 is a diagram depicting a basic minicell format as is well known in the art;

FIG. 3 is a diagram illustrating three minicells, including their headers and payloads, multiplexed into an ATM cell in accordance with prior methods;

DETAILED DESCRIPTION

Figure 4:
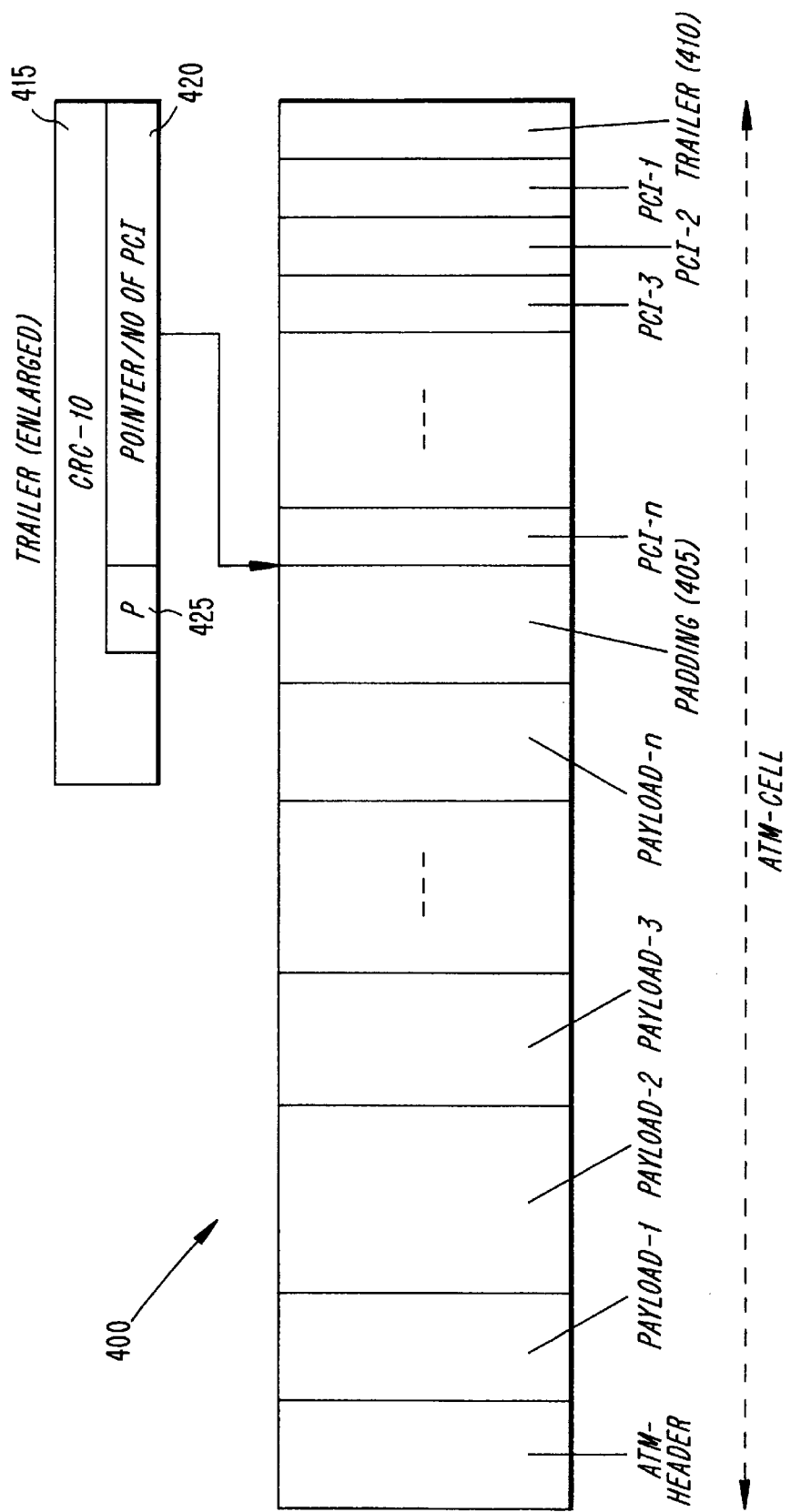
FIG. 4 is a diagram depicting the arrangement of minicell payloads and minicell headers in an ATM cell in accordance with an exemplary embodiment of the present invention.

FIG. 4 illustrates how minicells are to be inserted into the payload of an ATM cell 400 according to a first exemplary embodiment of the present invention. Unlike prior methods, a sending station inserts each minicell header, PCI-1, PCI-2 . . . PCI-n, into contiguous locations towards the rear end of ATM cell 400. The corresponding minicell payloads 1, 2 . . . n are inserted into contiguous locations towards the front of ATM cell 400. If necessary, a padding cell 405 can be inserted between minicell payload n and minicell header PCI-n.

In addition, a trailer code 410 is inserted at the very end of ATM cell 400. The trailer code 410 contains a CRC-10 (415). The CRC 415 is computed based on the value of each minicell header PCI-1 . . . PCI-n, in a manner that is very similar to the prior methods. The trailer code 410 also includes a five bit pointer 420 protected by a single parity bit 425. The pointer 420 identifies the starting location of the minicell header area within ATM cell 400. For example, the pointer may contain a value equivalent to the number of minicell headers multiplied by 2 (assuming each header is 2 octets in length), thus indicating that the minicell header area begins a certain number of octets from the trailer code 410. When the minicell headers are not octet aligned (i.e., the length of the minicell headers is not equal to 8 bits or any multiple thereof), the pointer 420 may alternatively contain a value equivalent to the number of minicell headers multiplied by the length of the minicell headers (i.e., the number of bits).

Once the ATM cell has been received, the receiving station recomputes the CRC using the minicell headers and the padding cell if necessary. However, unlike the prior methods, the minicell headers are inserted into contiguous locations within the ATM cell. Therefore, the receiving station hardware can compute the CRC without having to rely upon the LIC in each minicell header. Consequently, single bit errors will no longer cause the receiving station hardware to erroneously extract header data from the wrong locations, which in turn results in a burst of errors. Even if one or more bit errors do occur in the LICs of the various minicell headers, those errors are not compounded because the receiving station hardware, despite these errors, can still find the correct location of each header. As explained above, keeping the number of errors to a minimum significantly increases the probability of detecting and correcting those errors as is well understood in the art.

Once the receiving station hardware uses the CRC to detect and correct any bit errors that occur in the minicell headers, the hardware can reliably align the minicell payloads. In the event the ATM cell payload contains the second half of an overlapping minicell (i.e., a minicell having a payload length that exceeds the available bandwidth in the corresponding ATM cell, such that the minicell must be divided into two or more portions which are inserted into respective ones of two or more ATM cells), the sending station can insert an additional minicell header, wherein the length indicator code in the minicell header represents the number of octets which make up the length of the second half of the minicell. This additional minicell header guarantees that the receiving station can align the minicells despite the presence of an overlapping minicell.

Figure 5:
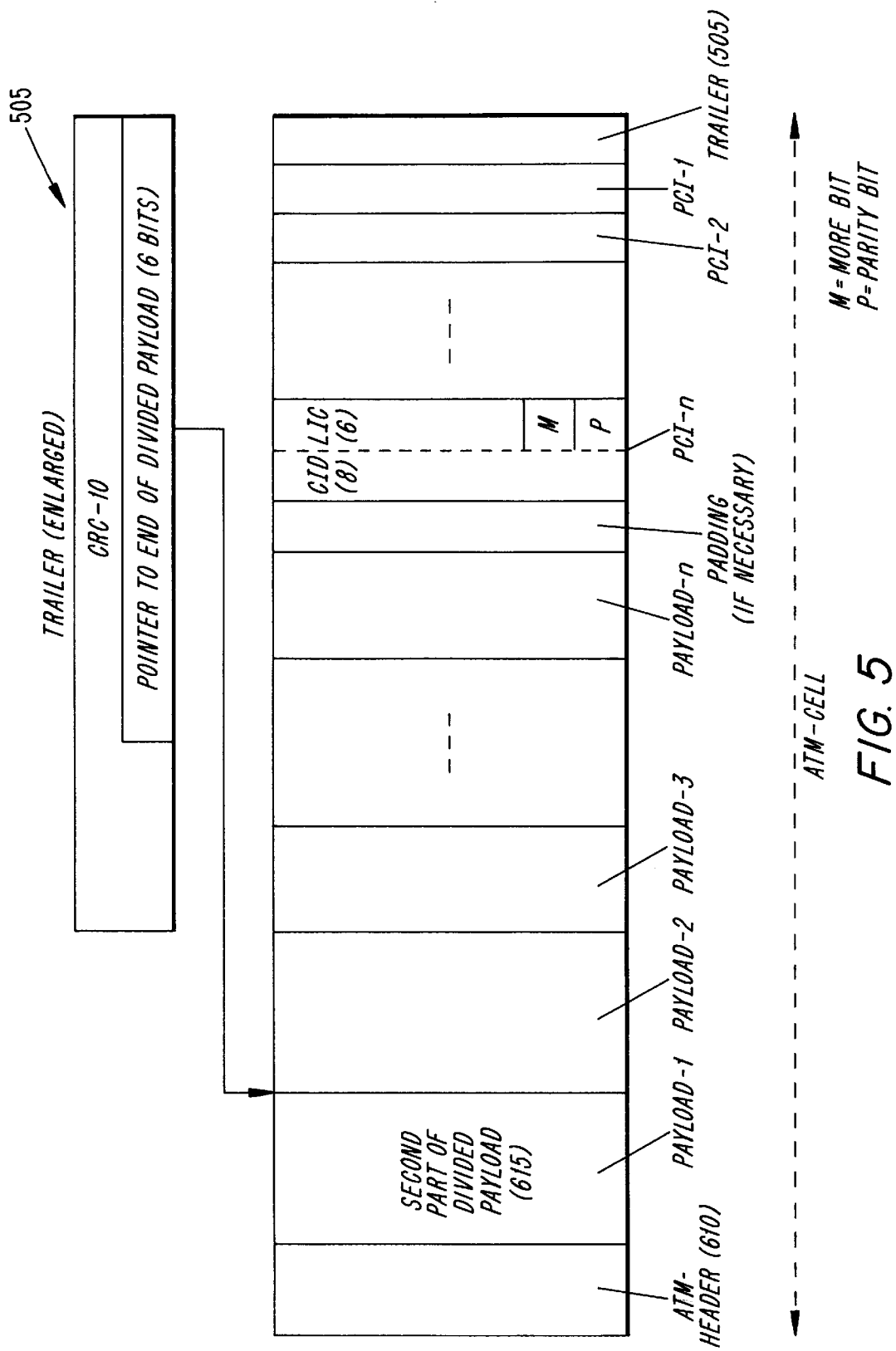
FIG. 5 is a diagram depicting the arrangement of minicell payloads and minicell headers in an ATM cell in accordance with a second exemplary embodiment of the present invention.

FIG. 5 illustrates a second exemplary embodiment. In the second exemplary embodiment, the trailer code 505 contains a six bit pointer which identifies the location of the first minicell payload 2. This location will typically be the first octet after the ATM cell header, except where the ATM cell contains the second half of an overlapping minicell 515. By inserting a special bit m protected by a parity bit p, the receiving station hardware can easily locate each minicell header to recompute the CRC. In this second exemplary method, the special bit m in each minicell header can be set equal to 1 except for the last header, PCI-n. In the last minicell header PCI-n, the special bit m is instead set to 0. When the receiving station hardware reads the 0, the hardware will know that this is the last minicell header in the ATM cell.

Figure 6:
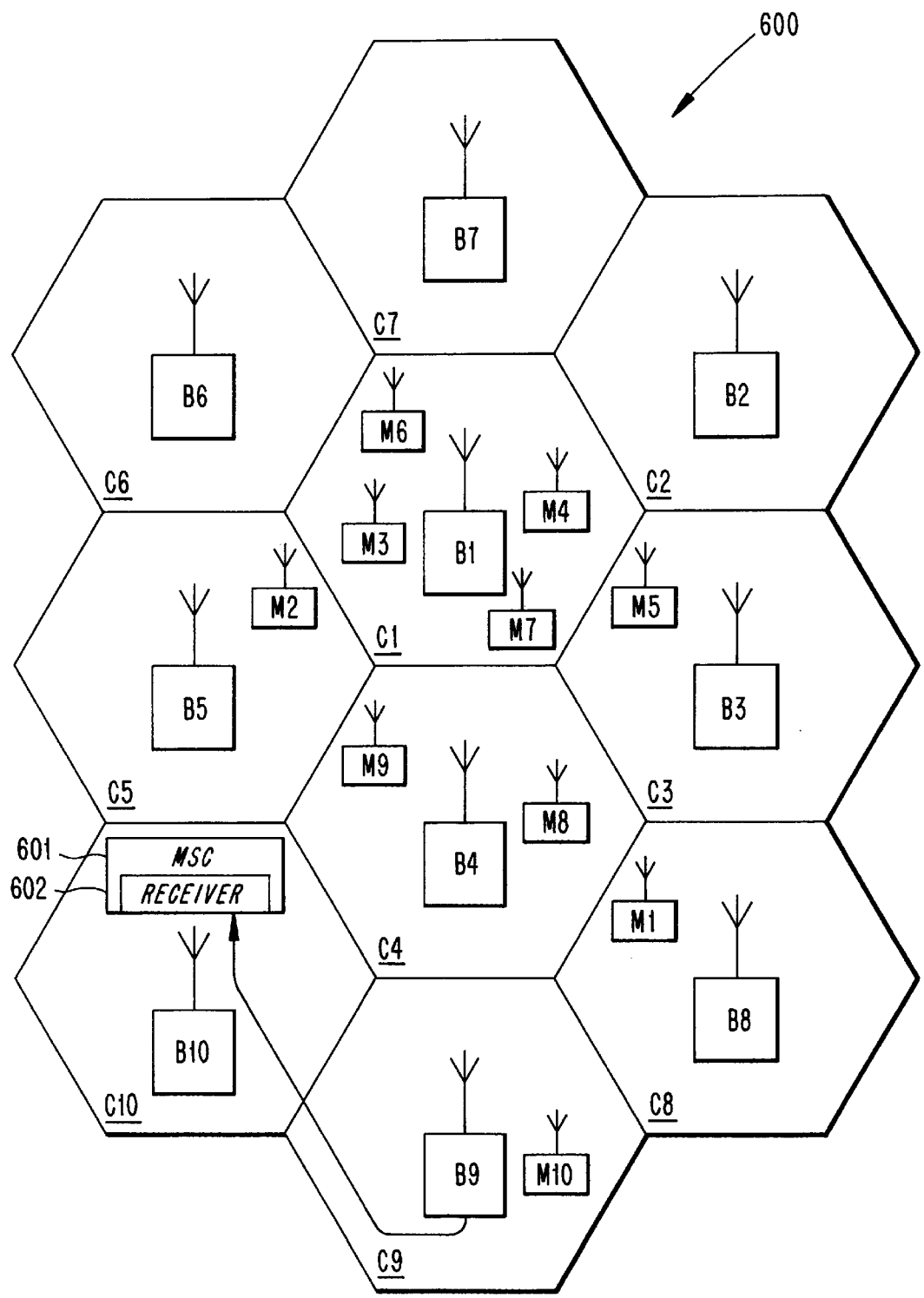
FIG. 6 is a diagram illustrating the physical arrangement of a typical cellular system.

As stated above, the telecommunication system may, for example, be a cellular telephone system 600, as illustrated in FIG. 6. In a typical cellular telephone system, there are a number of radio cells C1 through C10 each of which is serviced by a corresponding one of a plurality of base stations B1 through B10. The base stations B1 through B10 control the transmission of user data (i.e., voice data) from various mobile units M1 through M10 to a mobile switching center (MSC) 601. In general, the base stations B1 through B10 compress the user data into minicells as illustrated in FIG. 1. The minicell payloads and headers are then multiplexed into ATM cells in accordance with the first and second exemplary methods described above, along with a trailer code that contains a CRC based on each minicell header in the corresponding ATM cell. The base stations, for example B9, then transmit the ATM cells to the MSC 601. The MSC 601 contains a receiver 602 and signal processing hardware and software (not shown) which extracts the minicell headers, as described above, and recomputes the CRC codes to check the integrity of each minicell header, thus generating accurate minicell data which is vital to properly maintaining minicell alignment.

Although only the preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. In a telecommunication system, a method of maintaining data packet alignment, the method comprising the steps of:
    inserting communication data into a plurality of data packets, wherein each of the plurality of data packets comprises a variable length payload portion and a header portion;
    multiplexing the variable length payload portions into a corresponding plurality of contiguous locations in a data cell;
    multiplexing the header portions into a corresponding plurality of contiguous locations in the data cell;
    aligning each variable length payload portion in accordance with a corresponding one of the header portions
    generating a header integrity check code as a function of the header portions in the plurality of contiguous locations;
    inserting the header integrity check code into the data cell;
    transmitting the data cell to a receiving station; and
    prior to aligning, detecting and correcting bit errors in the header portions, using the header integrity check code.

2. A method in accordance with claim 1, wherein said step of inserting the header integrity check code into the data cell comprises the steps of:
    inserting the header integrity check code into a trailer segment; and
    inserting the trailer segment into the data cell.

3. A method in accordance with claim 2, wherein the trailer segment contains a pointer code identifying the location of the header portions within the data cell.

4. A method in accordance with claim 2, wherein the trailer segment contains a pointer code identifying the location of a first non-overlapping payload portion within the data cell.

5. A method in accordance with claim 1, wherein the header integrity check code is a cyclic redundancy code.

6. A method in accordance with claim 1, wherein the data packets are minicells.

7. A method in accordance with claim 1, wherein the data cell is an asynchronous transfer mode cell.

8. In a receiving station of a telecommunication system, a method of maintaining data packet alignment comprising the steps of:
    receiving a data cell which contains a plurality of contiguously located data packet payloads, a corresponding plurality of contiguously located data packet headers, and a trailer segment comprising a header integrity check code;
    regenerating a value for the header integrity check code as a function of the plurality of contiguously located data packet headers;
    detecting and correcting bit errors, if any, in the plurality of data packet headers as a function of the regenerated header integrity check code; and
    aligning the plurality of data packet payloads in accordance with the corrected data packet headers.

9. A method in accordance with claim 8, wherein said step of regenerating a value for the header integrity check code as a function of the plurality of contiguously located data packet headers comprises the steps of:
    identifying a first data packet header in accordance with a pointer contained in the trailer segment;
    extracting each data packet header from the contiguous data cell locations; and
    generating the header integrity check code value as a function of the extracted data packet headers.

10. A method in accordance with claim 8, wherein said step of regenerating a value for the header integrity check code as a function of the plurality of contiguously located data packet headers comprises the steps of:
    identifying the location of the first data packet header with a special flag bit contained within each data packet header;
    extracting each data packet header from the contiguous data cell locations; and
    generating the header integrity check code value as a function of the extracted data packet headers.

11. A method in accordance with claim 8, wherein said step of aligning the plurality of data packet payloads in accordance with the corrected data packet headers, comprises the step of:
    locating each of the plurality of data packet payloads in accordance with a corresponding one of the plurality of the data packet headers.

12. A method in accordance with claim 8, wherein said step of aligning the plurality of data packet payloads in accordance with the corrected data packet headers, comprises the step of:
    identifying the location, within the data cell, of a first data packet payload in accordance with a payload pointer contained in the trailer segment; and
    identifying the location, within the data cell, of each remaining data packet payload in accordance with a corresponding one of a plurality of corrected data packet headers.

13. A method in accordance with claim 8, wherein the header integrity check code is a cyclic redundancy code.

14. A method in accordance with claim 8, wherein the data packets are minicells.

15. A method in accordance with claim 8, wherein the data cells are asynchronous transfer mode cells.

16. An apparatus for maintaining data packet alignment in a telecommunication system, said apparatus comprising:

means for inserting communication data into a plurality of data packets, wherein each of the plurality of data packets comprises a variable length payload portion and a header portion;

means for multiplexing the variable length payload portions into a corresponding plurality of contiguous locations in a data cell;

means for multiplexing the header portions into a corresponding plurality of contiguous locations in the data cell;

means for aligning each variable length payload portion in accordance with a corresponding one of the header portions means for generating a header integrity check code as a function of the header portions in the contiguous locations;

means for inserting the header integrity check code into the data cell;

sending means for transmitting the data cell to a receiving station; and means for detecting and correcting bit errors in the header portions, using the header integrity check code, prior to aligning each payload portion.

17. An apparatus in accordance with claim 16, wherein said means for inserting the header integrity check code into the data cell comprises:

means for inserting the header integrity check code into a trailer segment; and means for inserting the trailer segment into the data cell.

18. An apparatus in accordance with claim 17, wherein the trailer segment contains a pointer code identifying the location of the header portions within the data cell.

19. An apparatus in accordance with claim 17, wherein the trailer segment contains a pointer code identifying the location of a first non-overlapping payload portion within the data cell.

20. An apparatus in accordance with claim 16, wherein the header integrity check code is a cyclic redundancy code.

21. An apparatus in accordance with claim 16, wherein the data packets are minicells.

22. An apparatus in accordance with claim 16, wherein the data cell is an asynchronous transfer mode cell.

23. An apparatus for maintaining data packet alignment in a receiving station of a telecommunication system comprising:

receiver means for receiving a data cell which contains a plurality of contiguously located data packet payloads, a corresponding plurality of contiguously located data packet headers, and a trailer segment comprising a header integrity check code;

processing means for regenerating a value for the header integrity check code as a function of the plurality of contiguously located data packet headers;

means for detecting and correcting bit errors, if any, in the plurality of data packet headers as a function of the regenerated header integrity check code; and means for aligning the plurality of data packet payloads in accordance with the corrected data packet headers.

24. An apparatus in accordance with claim 23, wherein said processing means comprises:

means for identifying a first data packet header in accordance with a pointer contained in the trailer segment;

means for extracting each data packet header from the contiguous data cell locations; and second processing means for generating the header integrity check code value as a function of the extracted data packet headers.

25. An apparatus in accordance with claim 23, wherein said processing means comprises:

means for identifying the location of the first data packet header with a special flag bit contained within each data packet header;

means for extracting each data packet header from the contiguous data cell locations; and means for generating the header integrity check code value as a function of the extracted data packet headers.

26. An apparatus in accordance with claim 23, wherein said means for aligning the plurality of data packet payloads in accordance with the corrected data packet headers comprises:

means for locating each of the plurality of data packet payloads in accordance with a corresponding one of the plurality of data packet headers.

27. An apparatus in accordance with claim 23, wherein said means for aligning the plurality of data packet payloads in accordance with the corrected data packet headers comprises:

means for identifying the location, within the data cell, of a first data packet payload in accordance with a payload pointer contained in the trailer segment; and means for identifying the location, within the data cell, of each remaining data packet payload in accordance with a corresponding one of a plurality of corrected data packet headers.

28. An apparatus in accordance with claim 23, wherein the header integrity check code is a cyclic redundancy code.

29. An apparatus in accordance with claim 23, wherein the data packets are minicells.

30. An apparatus in accordance with claim 23, wherein the data cells are asynchronous transfer mode cells.

* * * * *